United States Patent
Alexander

[11] 3,822,645
[45] July 9, 1974

[54] ADVANCED REINFORCED GRAIN DESIGN
[76] Inventor: Earl L. Alexander, 19380 Halsted St., Northridge, Calif. 91324
[22] Filed: Nov. 23, 1962
[21] Appl. No.: 240,205

[52] U.S. Cl............................ 102/102, 86/1
[51] Int. Cl.................................. F42b 1/02
[58] Field of Search.......... 102/98, 98 M, 103; 60/35.6 RS; 86/1, 20

[56] References Cited
UNITED STATES PATENTS

| | | | |
|---|---|---|---|
| 1,530,692 | 3/1955 | Paulus | 102/98 M |
| 2,917,424 | 12/1959 | Hirsch | 102/98 X |
| 2,977,884 | 4/1961 | Mahon et al. | 102/98 |
| 2,995,091 | 8/1961 | Haymes et al. | 102/98 |
| 3,067,686 | 12/1962 | Coover, Jr. et al. | 86/1 X |

Primary Examiner—Robert F. Stahl
Attorney, Agent, or Firm—Robert M. Sperry

EXEMPLARY CLAIM

1. A propellant grain comprising:
   a solid cylindrical decomposable polymeric matrix,
   a reinforcing metal lattice comprising an initially continuous and circumferentially aligned metal filament imbedded entirely throughout said matrix, comprising at least one continuous metal filament element primarily traversing a direction which is not parallel to any plane of symmetry in said matrix, said matrix and said lattice forming an elongated generally cylindrically-shaped propellant grain having an inner cavity,
   a plurality of recesses provided within said grain, said recesses communicating with said inner recess and intersecting a portion of said initially continuous and circumferentially aligned filaments.

4 Claims, 3 Drawing Figures

INVENTOR.
EARL L. ALEXANDER

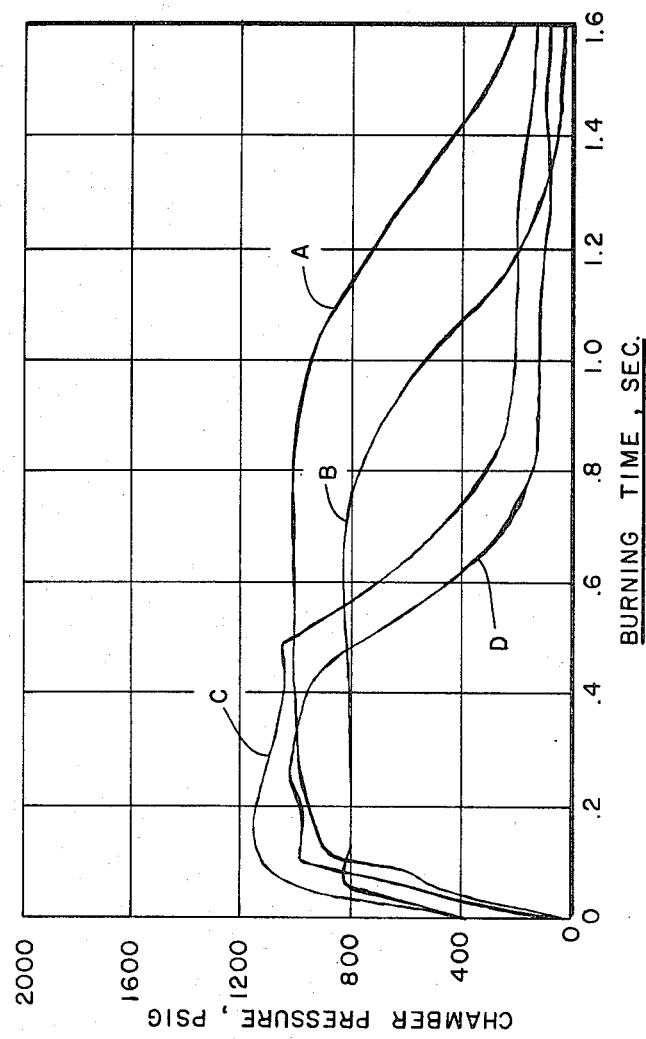

ADVANCED REINFORCED GRAIN DESIGN

This invention pertains to an improved solid propellant grain. More particularly, the invention pertains to improvement in a wire reinforced solid propellant grain.

Control over combustion pressure in a solid propellant rocket motor and associated thrust-time and thrust-to-weight ratio characteristics has been a major area of concern since the beginnings of study of solid propellant rocketry. During the time of development in the field, a few basic grain designs have evolved: the end burner, the case-bonded ported grain and internally-supported grains. Numerous variations of these particular configurations have been developed with various types of internal star point configurations, combinations of fast and slow-burning propellants and the like. These have been used by the grain designers to achieve control over the flight characteristics of the missiles.

Generally, the design objective is to provide an initial combustion surface within the solid propellant grain with the geometric property of constant or decreasing burning areas as increments of propellant are burned out in successive time intervals. Although each new missile usually requires a unique grain design, a neutral (constant pressure) or regressive (decreasing pressure) combustion pressure-time characteristic is required in nearly every grain design.

However, the most important criteria which the performance of a rocket engine is measured is that of specific impulse, $I_s$, which is the thrust per unit weight flow rate of propellant and which usually is expressed in seconds. The impulse of a solid propellant rocket engine is directly proportional to the log of the chamber pressure. The integral of engine thrust over the total time the propellant burns is the total impulse, $I_t$. In theory a given weight of propellant might be expected to deliver the same total impulse whether combustion is carried out over a longer time at low pressure or a shorter time at high prsssure. However, it is an observed fact that combustion at higher pressure is advantageous in obtaining appreciably more total impulse or useful energy from a given weight of propellants. The phenomena responsible for this are not completely understood but probably relates to more efficient combustion conditions in a thin principal flame reaction zone which moves closer to the surface of the propellant at higher pressure. However, it is difficult to obtain more initial burning area than the surface area presented by the case of the motor near burn-out. This is indicated by the complex shapes of mandrels that are used to form the combustion cavity in various model cast propellant rockets.

Once the initial internal combustion surface of a solid propellant rocket motor has been designed to provide as large a surface as possible and thus as large chamber pressure as possible, difficulties are presented in obtaining highly-regressive pressure-time characteristics. Since it is difficult to obtain a ratio of higher initial surface to lower burn-out surface, regressive pressure characteristics are not readily achieved. Since most grains have a progressive increase in chamber pressure due to increased burning surface or at best a slight decrease in pressure in complicated designed grains, a high strength case is needed to prevent the grain from exploding due to the burn-out pressures. The best cast propellant grain configurations can provide only 13 to about 20 percent decrease in the intial combustion pressure without leaving excessive slivers of unburned propellant or suffering inefficient volume loading. Large or medium size rocket motors are seldom designed to operate at 1,000 psi or higher combustion pressures, because of the penalty in case weight to sustain such higher pressures. Even though combustion efficiency increases at high pressures, the weight penalty inherent in motor cases designed to withstand such pressures higher than 1,000 psi becomes prohibited. It thus becomes apparent that in order to have initial high chamber pressure with the attendant high specific impulse it is imperative that the engine have a high regressivity such that the pressure at a subsequent elapsed time is substantially lower than that at the initial firing conditions so that a lightweight casing may be used with the motor not affecting any weight penalty.

It is an object of this invention to provide a highly-regressive burning solid propellant rocket motor.

Another object of this invention is to provide a solid propellant motor having high specific impulse and high regressivity.

A further object of this invention is to provide a solid propellant rocket motor having a low motor case weight at low burn-out pressures.

Still another object of the invention is to provide a solid propellant grain having an anisotrotic combustion characteristic.

One other object is to provide a solid propellant grain which is capable of burning successfully as a motor without any conventional motor casing.

The herein invention comprises improvement of the solid propellant grain described in co-pending application Ser. No. 144,265, filed Oct. 10, 1961. The co-pending application describes a solid propellant grain which is reinforced by winding fine filament material together on a mandrel with a matrix of an oxidizer and an organic binder. This filament is not parallel to any plane of symmetry in the matrix. The filament utilized is normally metallic wire selected from a class consisting of the metals of Group IIA through Group IVA, Group IB through Group VIIB and Group VIII of the Periodic Table. Aluminum and beryllium wires have been found to be particularly advantageous. Many variations of the composition used in the reinforced grain are possible. A typical composition, for example, would be 10 weight percent 5 mil aluminum wire, 10 percent of a carboxy-terminated linear polybutadiene as a binder and 80 percent of ammonium perchlorate as the oxidizer. The novel qualities of the reinforced propellant grain are derived less from any particular ingredient or combination of ingredients than from the properties of the fiber-reinforced material. Thus, any of the binders, oxidizers and types of fiber-reinforcing material disclosed in the co-pending application are applicable to the improvement disclosed herein. It has been unexpectedly discovered that the reinforced propellant exhibits directional physical and ballistic properties imparted by the linear nature of the reinforcing wire. The wire is predominately oriented in certain preferred directions and this provides a quality which might be an anisotropic combustion characteristic.

It has been found that the propellant burning rate in the direction of the reinforcing wires is three to four times the magnitude of the burning rate in the radial and longitudinal directions which are both transverse to the wire. As a result of this, it has been discovered that a cut into the grain in any direction from the internal cylindrical burning surface will expose wire ends producing a faster propellant-burning surface. For example, a radially longitudinally-slotted propellant reinforced grain possesses a high degree of regressivity with initial high chamber pressure and specific impulse.

It is believed the invention will be better understood from the following detailed drawings in which:

FIG. 3 is a chart of the chamber pressure versus the burning time for four varieties of propellant grains of this invention.

Figure 1:
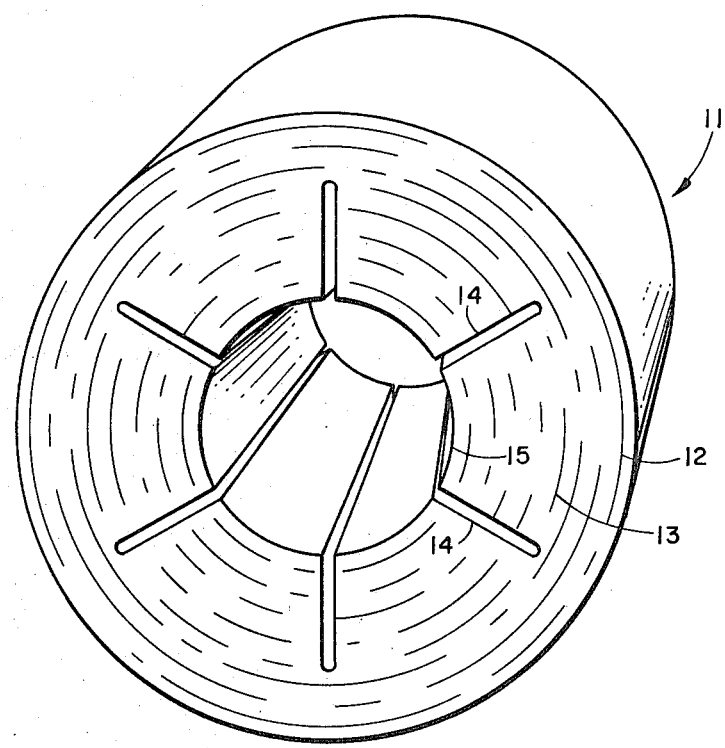
FIG. 1 is a pictorial view of a solid propellant grain of this invention.

With particular reference to FIG. 1 there is shown the propellant grain 11 of this invention. The grain is comprised of the matrix 12 having embedded therein circumferentially-wrapped reinforcing wires 13. As previously described, any of the propellant compositions and reinforcing wires disclosed in co-pending application Ser. No. 144,265 are applicable as well to this invention. The grain is generally made in accordance with the description set forth in co-pending application Ser. No. 179,466, filed Mar. 19, 1962. Generally, as described in this co-pending application, reinforcing wire is circumferentially wound about a mandrel while the matrix of propellant binder and oxidizer is fed onto the mandrel eventually building up a grain to the desired size and shape.

In the particular embodiment shown in FIG. 1, the reinforced grain was six inches long and had a six-inch outside diameter with a three-inch inside diameter. The composition of the grain was 12.93 percent aluminum, 11.32 weight percent binder which was carboxy-terminated linear polybutadiene, and 75.75 weight percent of ammonium perchlorate as the oxidizer. Upon removal from the mandrel, the grain was provided with slots 14 using a metal cutting saw blade. It is obvious that this procedure can be accomplished with an automatic cutting means when desired. In this particular grain, the slots were .154 inches wide and were 1 inch in depth or two-thirds the width of the web extending from the inner cavity 15. It is found for this particular situation that these dimensions of the slot gave very desirable burning characteristics and contours to the grain. It should be clearly pointed out that the number of slots, the width and length of slots or even the configurations cut into the grain can vary considerably. The grain designer has, in fact, increased latitude in the choice of particular configurations which will yield particular properties that are desired for a given situation.

For testing purposes the slotted grain, shown in FIG. 1, was wrapped with glass tape and epoxy resins and cemented into a 6-inch steel motor tube with integral rocket throat portion. The ends were inhibited as is known in the art permitting only the inner cylindrical surface and the slotted surfaces to burn. A 60-gram igniter and blow-out plug in the nozzle throat were utilized. Ignition was generally faster than with cylindrical grains. This is explained by the more easily ignited rough-slotted surfaces and by the more burning area present.

Figure 2:
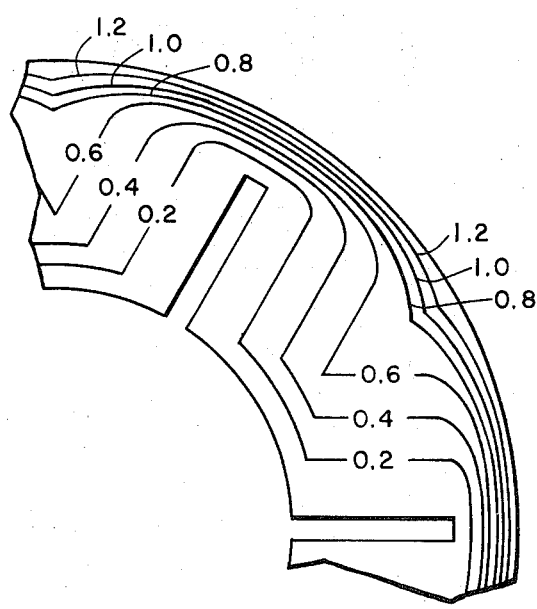
FIG. 2 represents grain surface contours for the grain shown in FIG. 1.

The slotted reinforced grain concept is based on the novel discovery that the propellant will burn more slowly in a radial direction. FIG. 2 represents a typical slotted grain cross-section with burning surface contours plotted for successive time intervals. A simple explanation of the combustion-time characteristic is that the bulk of the propellant burns in a short time to a radius slightly beyond the bottom of the slots. The remainder of the grain serves as a pressure vessel during this high pressure plateau period and is consumed at a much slower rate after the fast-burning or circumferential mode propellant surfaces are gone. The combustion surface contour at .6 seconds in FIG. 2 corresponds to the rapidly-declining portion of the pressure-time curve as shown in FIG. 3. The spacing between contour lines in the circumferential direction is about three times the radius spacing which accounts for the increased degree of pressure regressivity in comparison with similar slotted cast non-reinforced propellant grain configurations. It is pointed out that the circumferential combustion surface remains nearly constant until about .5 second when the top corners of adjacent slots meet to form a star point. These faster-burning surfaces supply about 75 percent of the combustion gas in a six slot grain, for example. Pressure is thus quite sensitive to changes in circumferential burning area. Once the star points are formed and start to recede, the pressure drops very rapidly. Also, as is noted from FIG. 2, that because of the tendency for only the slower-burning radial combustion surfaces to remain, very little propellant is left in slivers near burn-out.

The effect of providing four, six, eight and 10 longitudinal slots is best indicated in the pressure-time traces shown in FIG. 3. A regular shift in the centroid of the area under the pressure-time curve toward shorter times with increasing slots is apparent. No difficulty is experienced in firing a 10 slot motor. It is possible to provide even more slots to obtain higher short term initial acceleration followed by sustained thrust if so is desired. The other extreme — the four slot grain burned most of the propellant under constant pressure yet the gradual decrease in pressure toward burn-out still permits the use of a lightweight motor case. The same type traces have been obtained when the nozzle throat area was adjusted in each case to obtain a plateau pressure of 2,000 psi. When the slot depth was increased with all other variables including nozzle throat area held constant, the resulting increased circumferential burning area produced the expected increase in the plateau pressure.

Additionally, the novel concepts of this invention are utilized to develop a caseless rocket propellant motor. To illustrate this, the previously-described grain was utilized having an addition of an excess of an aluminum wire in the outer one-eighth inch of the grain. The motor was fired without a motor case of any kind and without external support in the circumferential direction. The extra aluminum wire in the upper case served the double purpose of lending additional support to resist combustion pressure and as propellant fuel near burn-out. The change in propellant composition at the outside of the grain retarded the burning rate and decreased the pressure sufficiently so that the thin-walled propellant shell near burn-out did not rupture. Only 100 grams of residue remained from a grain that initially weighed 3,200 grams. Nearly the total weight of the gram including the outer layer was thus converted into useful thrust.

Other configurations may be utilized so as to provide burning along the wire exposed. Such configurations may include, for example, longitudinal, transverse and helical recesses. Each grain may thus be tailored for a desired end result according to the type of recesses provided.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A propellant grain comprising:
 a solid cylindrical decomposable polymeric matrix,
 a reinforcing metal lattice comprising an initially continuous and circumferentially aligned metal filament imbedded entirely throughout said matrix, comprising at least one continuous metal filament element primarily traversing a direction which is not parallel to any plane of symmetry in said matrix, said matrix and said lattice forming an elongated generally cylindrically-shaped propellant grain having an inner cavity,
 a plurality of recesses provided within said grain, said recesses communicating with said inner recess and intersecting a portion of said initially continuous and circumferentially aligned filaments.

2. The propellant grain of claim 1 wherein said recesses communicating with said inner cavity comprise a plurality of longitudinal radially-extending slots.

3. A solid propellant rocket motor comprising:
 a solid cylindrical decomposable polymeric matrix,
 a reinforcing metal filament lattice comprised of continuous filaments supported circumferentially entirely throughout said matrix, comprising at least one continuous metal filament element primarily traversing a direction which is not parallel to any plane of symmetry in said matrix, said matrix and said lattice forming an elongated cylindrically-shaped propellant grain having an inner cavity, said filament lattice being more closely spaced within said matrix at the outer circumference of said grain so as to increase the percent of filament lattice in the area of the outer circumference,
 and a plurality of recesses provided within said grain, said recesses communicating with said inner cavity and intersecting said filaments.

4. The method of forming a regressive solid propellant grain comprising:
 forming a solid decomposable polymeric matrix,
 disposing a reinforcing metal filament lattice comprised of continuous filaments circumferentially throughout said matrix, said lattice comprising at least one continuous metal filament element primarily traversing a direction which is not parallel to any plane of symmetry in said matrix,
 and forming a plurality of recesses within said grain, said recesses intersecting said filaments to expose ends thereof.

* * * * *

PO-1050
(5/69)

UNITED STATES PATENT OFFICE
CERTIFICATE OF CORRECTION

Patent No. 3,822,645                    Dated July 9, 1974

Inventor(s) Earl L. Alexander

It is certified that error appears in the above-identified patent and that said Letters Patent are hereby corrected as shown below:

Cover page "[73] Assignee" insert --Rockwell International Corporation El Segundo, California--.

Column 4, line 59, "upper" should read --outer--.

a reinforcing metal lattice comprising an initially continuous and circumferentially aligned metal filament imbedded,
a reinforcing metal lattice comprised of continuous filaments supported circumferentially entirely throughout said matrix, comprising at least one continuous metal filament element primarily traversing a direction which is not parallel to any plane of symmetry in said matrix, said matrix and said lattice forming an elongated generally cylindrically-shaped propellant grain having an inner cavity,
a plurality of recesses provided within said grain, said recesses communicating with said inner recess and intersecting a portion of said initially continuous and circumferentially aligned filaments.--

Signed and sealed this 21st day of January 1975.

(SEAL)
Attest:

McCOY M. GIBSON JR.
Attesting Officer

C. MARSHALL DANN
Commissioner of Patents

UNITED STATES PATENT OFFICE
CERTIFICATE OF CORRECTION

Patent No. 3,822,645          Dated July 9, 1974

Inventor(s) Earl L. Alexander

It is certified that error appears in the above-identified patent and that said Letters Patent are hereby corrected as shown below:

Cover page "[73] Assignee" insert --Rockwell International Corporation El Segundo, California--.

Column 4, line 59, "upper" should read --outer--.
Column 5, line 16, Claim 1 should read as follows:
--1. A propellant grain comprising:
   a reinforcing metal lattice comprising an initially continuous and circumferentially aligned metal filament imbedded,
   a reinforcing metal lattice comprised of continuous filaments supported circumferentially entirely throughout said matrix, comprising at least one continuous metal filament element primarily traversing a direction which is not parallel to any plane of symmetry in said matrix, said matrix and said lattice forming an elongated generally cylindrically-shaped propellant grain having an inner cavity,
   a plurality of recesses provided within said grain, said recesses communicating with said inner recess and intersecting a portion of said initially continuous and circumferentially aligned filaments.--

This certificate supersedes Certificate of Correction issued January 21, 1975.

Signed and sealed this 1st day of April 1975.

(SEAL)
Attest:

RUTH C. MASON
Attesting Officer

C. MARSHALL DANN
Commissioner of Patents
and Trademarks